United States Patent [19]

Olesen

[11] 4,214,265
[45] Jul. 22, 1980

[54] METHOD AND DEVICE FOR SUPERVISING THE SPEED OF AN OBJECT

[76] Inventor: Lykke Olesen, Granvägen 4, 130 40 Djurhamn, Sweden

[21] Appl. No.: 896,411

[22] Filed: Apr. 14, 1978

Related U.S. Application Data

[63] Continuation-in-part of Ser. No. 731,278, Oct. 12, 1976, abandoned.

[30] Foreign Application Priority Data

Oct. 16, 1975 [SE] Sweden .............................. 7511635

[51] Int. Cl.$^2$ .............................................. H04N 7/18
[52] U.S. Cl. ................................... 358/93; 340/38 P; 358/107
[58] Field of Search ................. 358/93, 105, 107, 108, 358/136; 340/38 P

[56] References Cited

U.S. PATENT DOCUMENTS

| | | | |
|---|---|---|---|
| 3,532,042 | 10/1970 | Pedersen | 354/105 |
| 3,685,012 | 8/1972 | Case | 340/38 P |
| 3,890,462 | 6/1975 | Limb | 358/105 |
| 3,890,463 | 6/1975 | Ikegami | 358/93 |

*Primary Examiner*—Howard W. Britton
*Attorney, Agent, or Firm*—Pollock, Vande Sande & Priddy

[57] ABSTRACT

A system for supervising the speed of an object, such as a vehicle, relative to a reference point, wherein a TV-camera is utilized. The TV-camera is mounted at the reference point and directed at a certain, preferably right angle to the direction of movement of the object, so that the field of view of the TV-camera includes a measuring distance. The video output signal from the TV-camera is fed to a black level sensor which in turn activates a pulse generator while the image of the object is passing between two given marking lines on the TV-image corresponding to the measuring distance. The pulses thus generated are counted, and the counted number of pulses constitutes a measure of the speed of the object (i.e., inverse proportionality).

5 Claims, 6 Drawing Figures

(VIDEO SIGNAL PROCESSING UNIT)

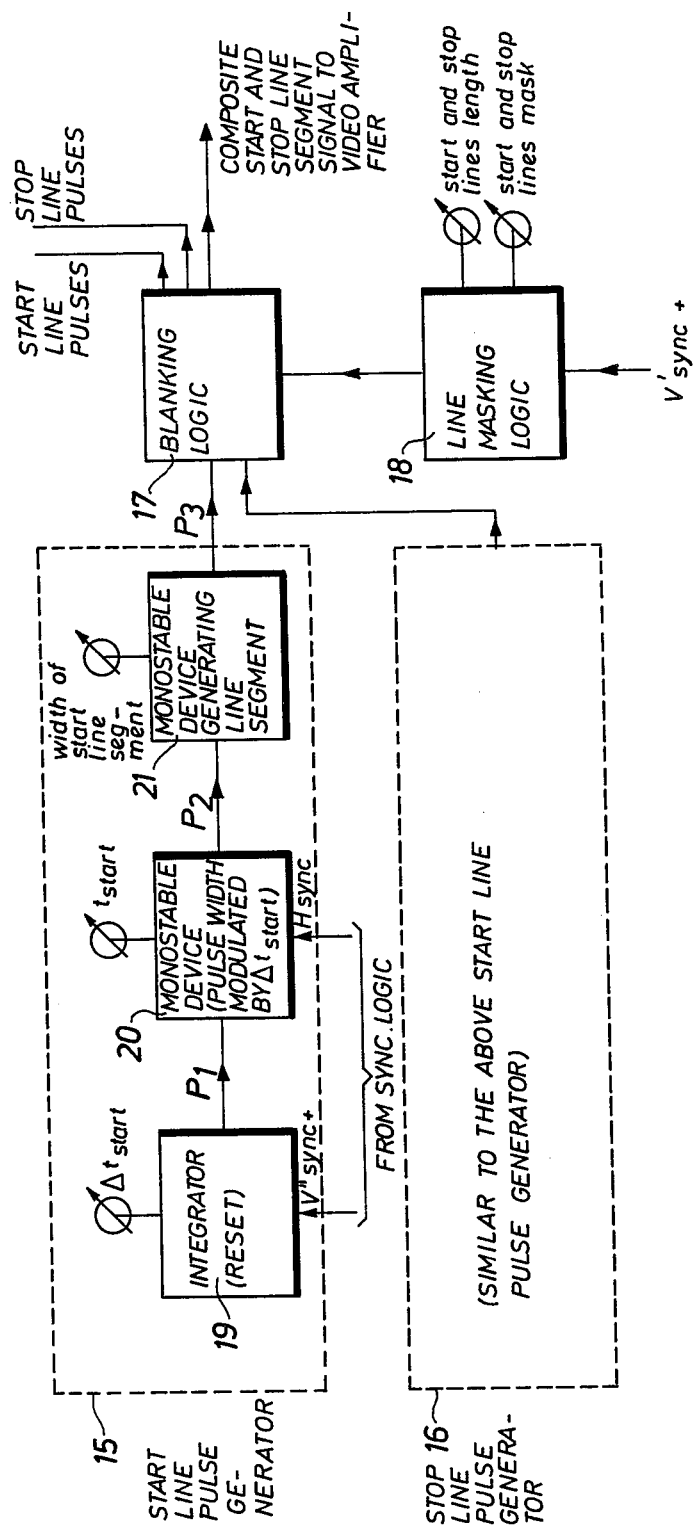

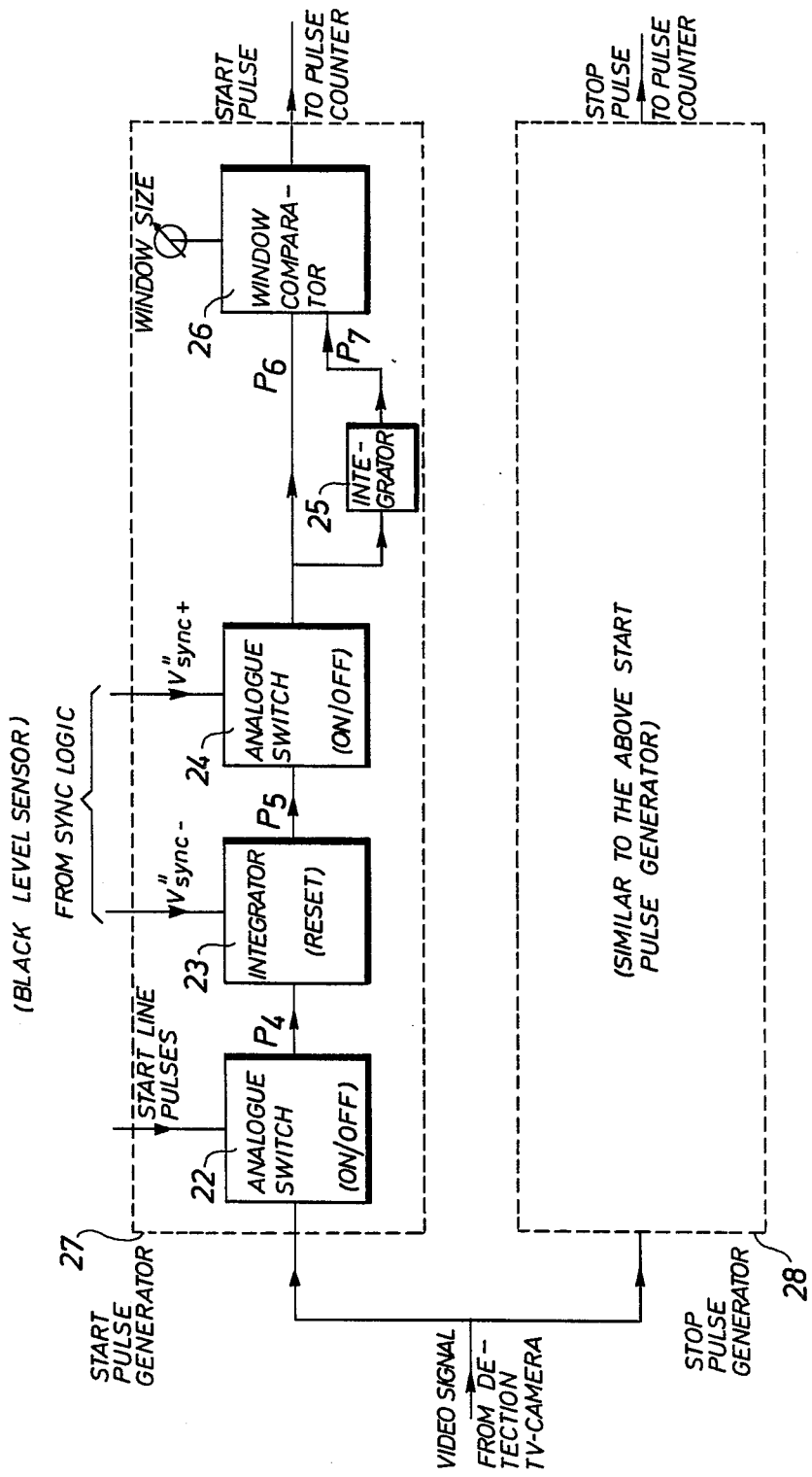

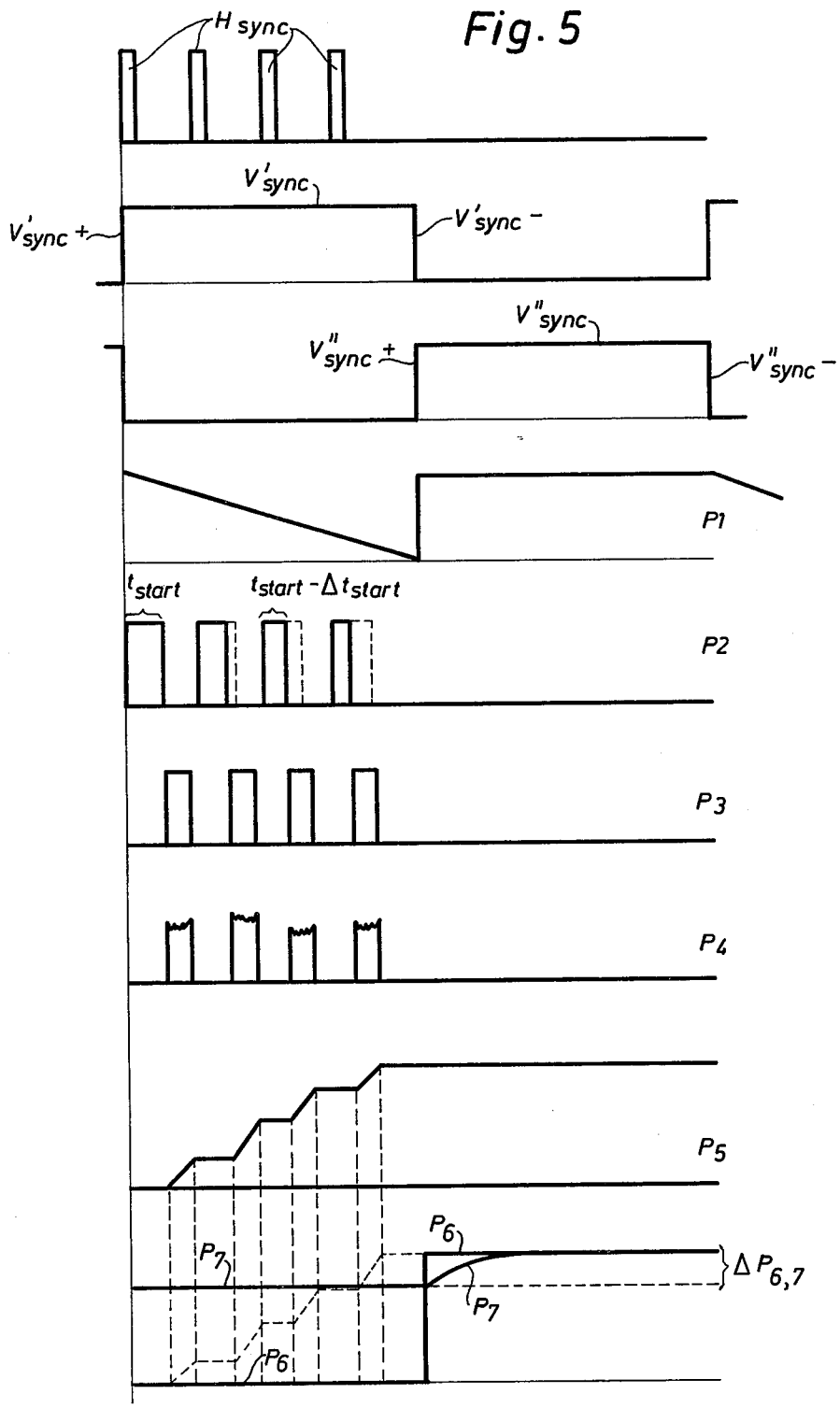

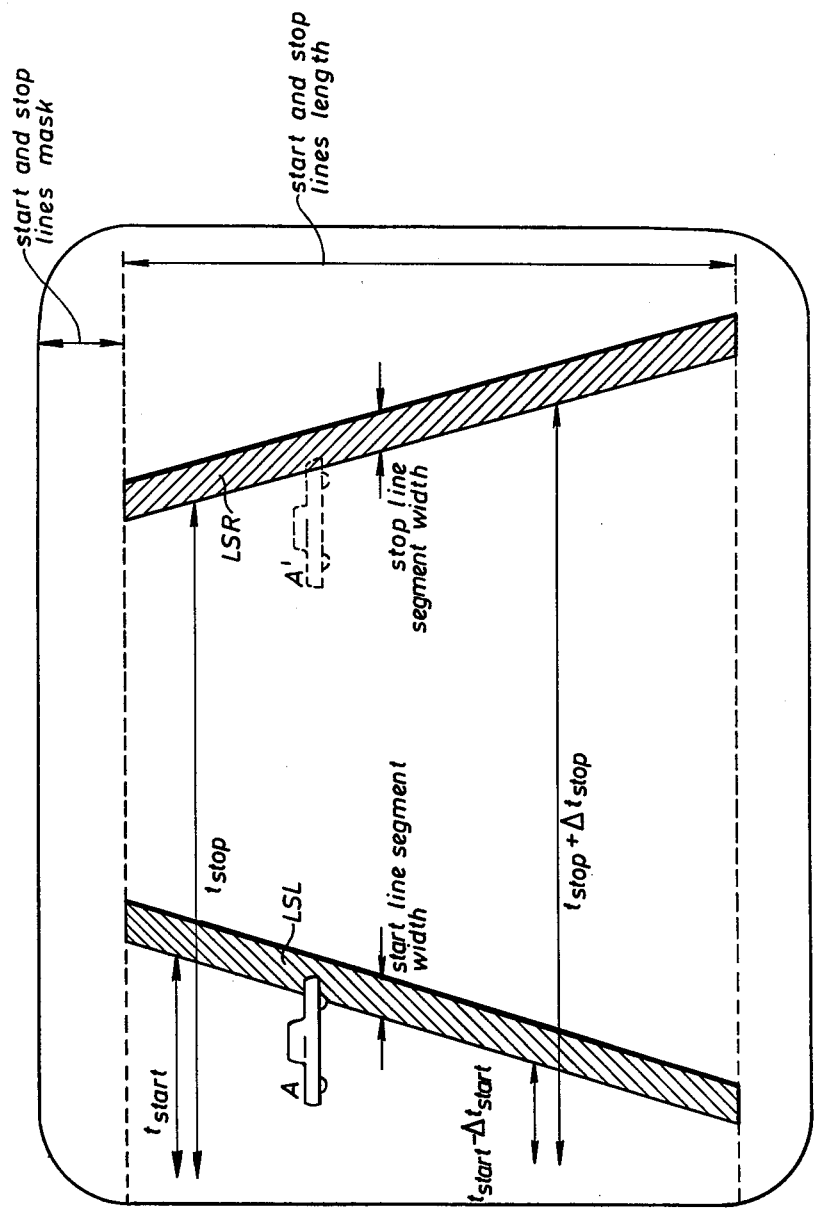

METHOD AND DEVICE FOR SUPERVISING THE SPEED OF AN OBJECT

REFERENCE TO RELATED APPLICATION

This is a continuation in part of pending application Ser. No. 731,278, filed Oct. 12, 1976, now abandoned.

BACKGROUND OF THE INVENTION

The present invention relates to a system for measuring and/or checking the speed of an object, such as a vehicle or a boat, relative to a reference point.

The background of the invention is the need for a reliable system for surveying, e.g., the speed of vehicles moving on a road having a regulated speed limit. At present such surveillance is generally accomplished by means of various types of radar apparatus for speed measurement, such apparatus being placed close to the roadway. When the emitted radiation is reflected against a moving vehicle, an alteration in the frequency of the radiation (Doppler effect) occurs, and this frequency shift is proportional to the speed of the object. By registration on a strip of paper, a diagram is obtained, from which the vehicle speed may be determined.

However, this known method has several disadvantages, including the uncertainty of the measured values and the problems of subsequently analyzing the traffic situation at the time of measurement and positively identifying the vehicle.

Apart from such well-known speed measurement systems, a general traffic surveillance and control system using a TV-camera and video signal processing means is known from U.S. Pat. No. 3,685,012 of Aug. 15, 1972. Although the latter system can be used for determining a plurality of data relating to the traffic situation on a roadway, it is not ideally suited for speed measurement and supervision. Thus, the system comprises alternating patterns disposed on the surface of the roadway, and the TV-camera is mounted so that passing vehicles will partially obscure contrasting portions of the pattern in the field of view of the camera. The video signal is then processed to obtain various data associated with the vehicular traffic. However, the pattern to be placed on the road surface renders the system unsuitable for movable applications, e.g., for checking vehicle speeds at different locations along roads having speed regulations. Apart from the work involved in placing such pattern strips on the road surface, the patterns will be visible to the drivers of the vehicles, which makes secret surveillace impossible. Moreover, in winter, falling snow may totally cover the pattern and make measurements impossible.

SUMMARY OF THE INVENTION

It is therefore a main object of the invention to provide a TV-based system using video signal processing means which enable effective speed surveillance without the aforesaid drawbacks. Specifically, the system should permit accurate speed measurement without the use of reference objects, such as pattern strips or the like, positioned in the view field of the TV-camera.

A further object of the invention is to provide a system which can be utilized also for measuring the speed of objects moving in the air or at sea, where points of reference are difficult to arrange.

To realize these objects, the present invention provides a new method for supervising the speed of an object, such as a vehicle, relative to a reference point, comprising the steps of utilizing a TV-camera, which is mounted at the reference point and directed at a certain angle ($\alpha$) to the direction of movement of the object, so that the object will pass substantially sideways in the field of view of the TV-camera; triggering a pulse generator by means of video signals derived from the TV-camera; and counting the pulses generated by the pulse generator while the image of the object is passing between two given marking lines on the TV-image, said marking lines corresponding to a measuring distance, the counted number of pulses constituting a measure of the speed of the object.

According to the invention, there is also provided a device for supervising the speed of an object while the latter passes between the end points of a measuring distance, comprising a TV-camera to be mounted at a reference point and directed at an angle to the path of movement of the object between said end points, so that the object will pass substantially sideways in the field of view of the TV-camera, and video signal processing means connected to the TV-camera. These processing means include first means for generating pulses at instances in a predetermined time relationship to the sync pulses associated with the TV scanning process, a first group of pulses corresponding to a first, substantially vertical line segment of the TV-image, whereas a second group of pulses correspond to a second, substantially vertical line segment of the TV-image, said first and second line segments being spaced apart at a distance so as to define said measuring distance in conjunction with said angle and the distance of the TV-camera from said movement path; second means for comparing, between successive frame scanning operations, the integrated black level contained in the video signal portions corresponding in time respectively to said first and second groups of pulses, said second means delivering a short pulse upon a predetermined black level change in successive video portions corresponding to said first group of pulses, and a stop signal upon a predetermined black level change in successive video signal portions corresponding to said second group of pulses; and third means, such as a clock pulse counter, for measuring the time period elapsing between said start and stop pulses. Hereby, the speed of the object can be easily calculated on the basis of the measuring distance and said time period.

It should be pointed out that the invention, apart from speed surveillance of vehicles, is applicable to a plurality of situations where it is of interest to measure or control the speed of an object. Thus, the invention can be applied to other types or police of military speed measurements, wind tunnel tests, retardation measurements, in sports, for monitoring industrial processes, etc.

BRIEF DESCRIPTION OF THE DRAWINGS

The invention will now be described with reference to the accompanying drawings illustrating one embodiment of the invention by way of example.

FIG. 3 is a block diagram of the essential components of a black level sensor circuit contained in the video signal processing unit;

FIG. 4 is a block diagram of the essential components of a start and stop line pulse generator circuit contained in the video signal processing unit;

FIG. 5 illustrates some of the pulses appearing in the circuits of FIG. 3 and 4; and FIG. 6 shows schematically the TV-image on the TV-monitor connected to the video signal processing unit.

DETAILED DESCRIPTION OF THE INVENTION

Figure 1:
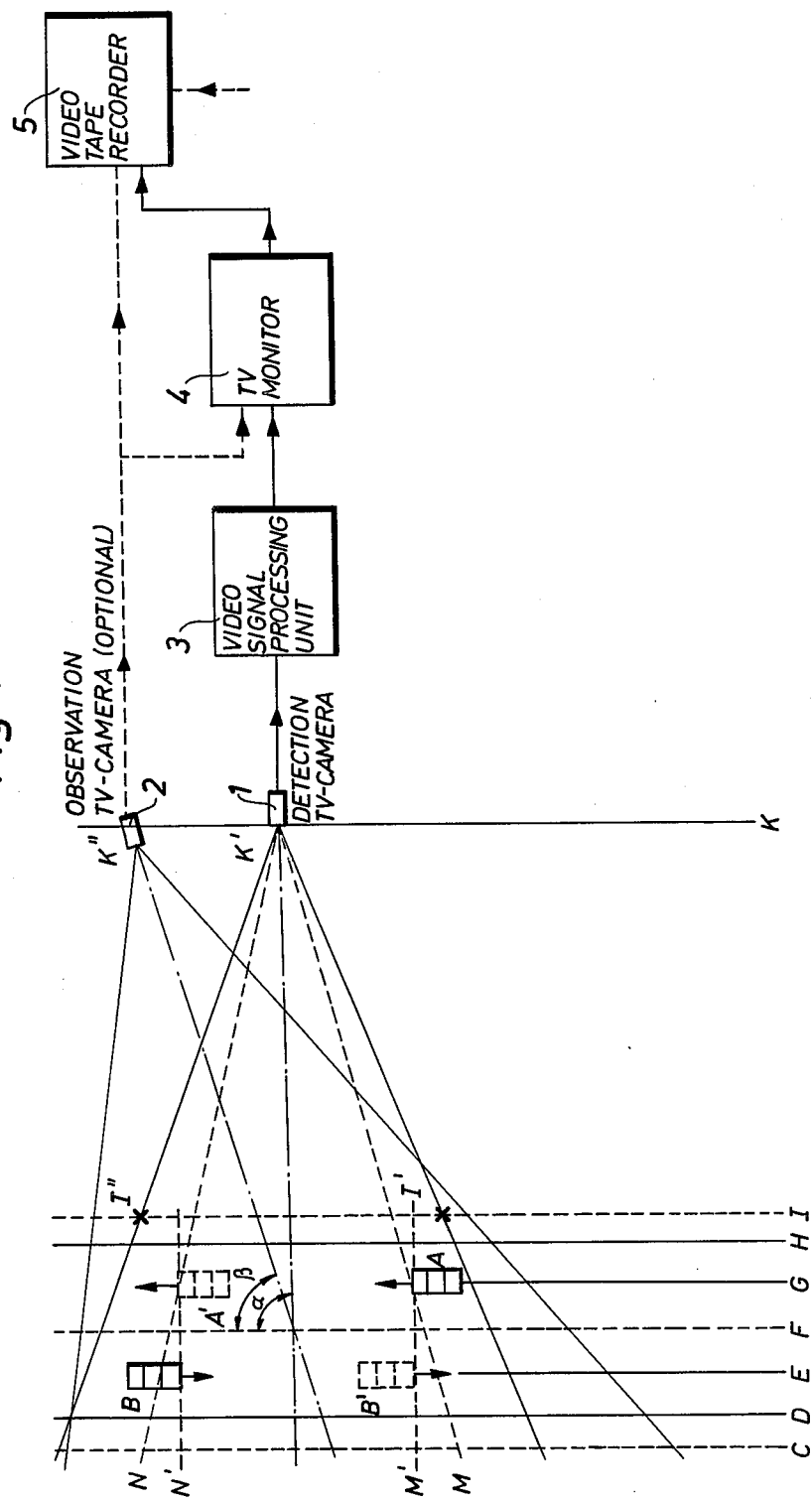
FIG. 1 shows schematically two television cameras mounted near a road, and units connected to the cameras for determining and registering the speed of passing vehicles.

As appears from FIG. 1, a detection TV-camera 1 is mounted at a distance (I-K) from the roadside I, this camera being directed essentially at right angles ($\alpha$) to the center line F of the road section. The distance I-K is preferably about 30 to 40 meters. To facilitate the positioning of the camera, two markings I', I" are placed by the roadside at some distance from each other, whereby exact positioning of the detection-TV-camera can be accomplished in a manner known per se.

By means of the detection-TV-camera 1, the speed of a passing vehicle A can be determined, as will be described below. At some distance from the detection-TV-camera 1 at point K', a second TV-camera 2 is mounted at a point K" for observing the measuring area from a different angle and/or identifying the passing vehicles.

As appears further from FIG. 1, the video output of the detection-TV-camera is connected to a video signal processing unit 3, which in turn is connected to a TV-monitor 4. By means of the video signal processing unit 3, which will be described more fully below, information on the speed of a passing vehicle is obtained in digital form, and this speed value is presented on the TV-monitor 4 together with the exact time (year, date and time of day). The observation TV-camera 2 is optionally connectable to the TV-monitor, making it possible to separately observe the passage of the vehicle from a different angle ($\beta$).

A video tape recorder 5, preferably having at least two channels, may be connected to the observation TV-camera 2 as well as to the TV-monitor 4, whereby simultaneous registration of the course of events, the measured speed and the time are made possible. Preferably the video tape recorder 5 also has a sound track for simultaneous recording of the comments on the course of events made by the surveying personnel.

As appears from FIG. 2, the video signal from the detection-TV-camera 1 is transmitted, on the one hand, directly to a video amplifier and sync mixer circuit 6 so as to enable the display of an ordinary TV-image on the TV-monitor 4 and, on the other hand, to a black level sensor circuit 7 designed according to the principles of the present invention, as will be described further below. Thus, when the vehicle A passes the dotted line M (FIG. 1), the black level sensor circuit 7 will emit a start pulse to a pulse counter 8, thereby triggering the latter to start counting the clock pulses from a clock pulse generator 9 connected to the input of the counter 8. The counter will continue counting until the vehicle (at position A') passes the dotted line N (FIG. 1). The count value thus obtained is forwarded to a converter 10, where it is transformed to the desired speed value, which is inversely proportional to the count value and is easily calculated on the basis of the measuring distance (which is known beforehand) between the vehicle positions A and A' and the count value representing the time period elapsing while the vehicle passes between these two positions.

A character generator 11 provides the desired text and digital values, including the measured speed value and a time reference obtained from a digital clock 12 connected thereto. The desired text and digital values are fed via the video amplifier 6 and are presented on the TV-monitor 4 as characters superimposed on the regular TV-image showing the passing vehicle and the environmental scenery.

The black level sensor circuit 7 is controlled by a circuit 12 generating start and stop line pulses. These pulses appear at instances related to the sync pulses in such a way that they correspond to substantially vertical line segments (left and right) LSL and LSR on the TV-image (see FIG. 6). The lines LSL and LSR correspond to the end points of the actual measuring distance (A-A').

Figure 2:
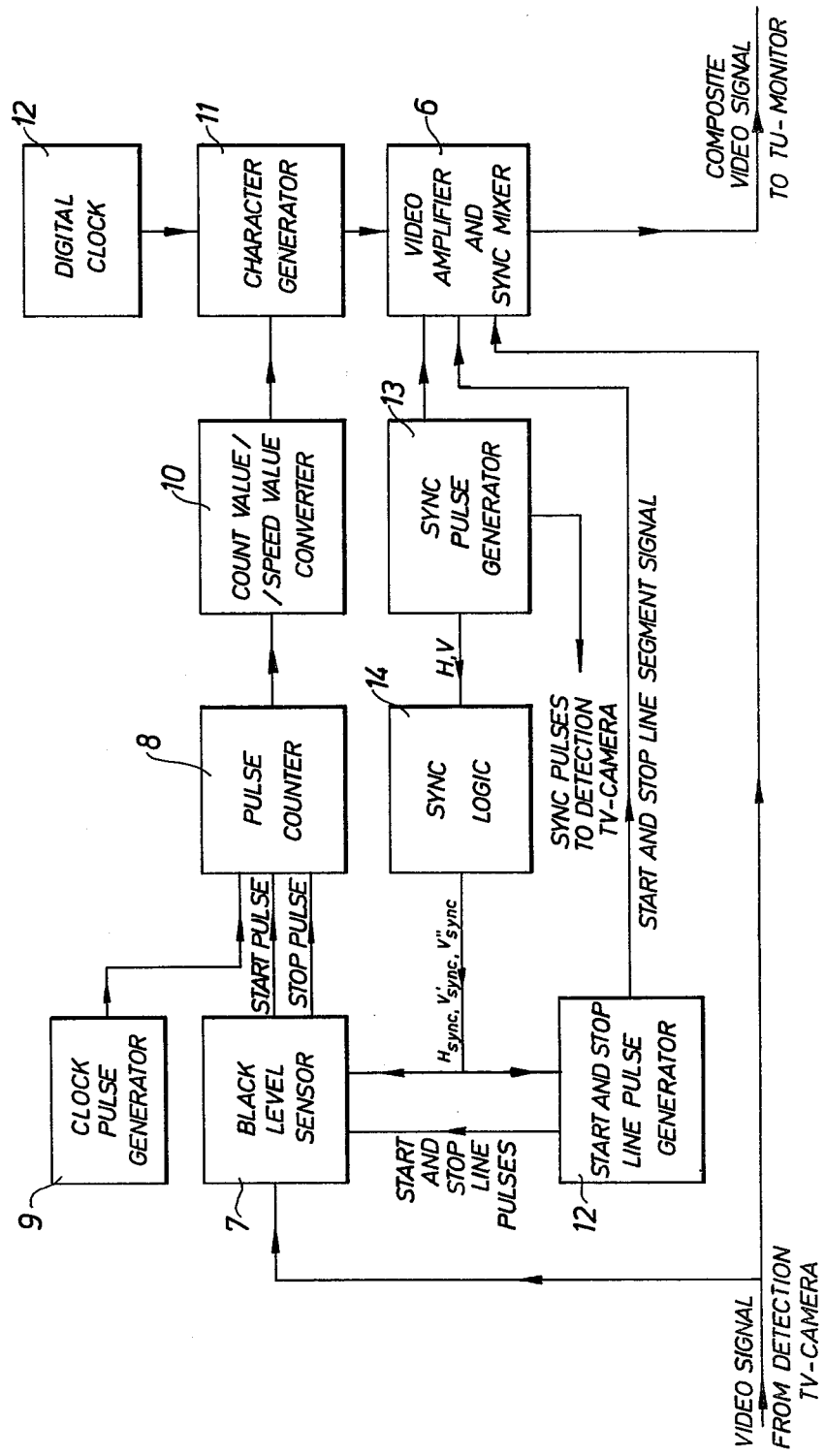
FIG. 2 is a block diagram of the various circuits contained in a video signal processing unit connected to one of the TV-cameras.

It will further be seen from FIG. 2 that a sync pulse generator 13 (of the kind generally used in television systems) delivers sync pulses to the TV-camera 1, to the video amplifier and sync mixer 6, and, via a sync logic circuit 14, to the circuits 12 and 7, so as to synchronize the operation of the various circuits of the video signal processing unit 3.

In the sync logic circuit 14, the horizontal sync pulses $H_{sync}$ (see FIG. 5, where, for the sake of simplicity, the pulses $H_{sync}$ are shown as more scarcely distributed than is really the case) pass through unaltered, whereas the vertical sync pulses are divided into two halves $V'_{sync}$ and $V''_{sync}$ each representing a whole frame scanning over every second line, i.e. a "half" picture distributed over the whole picture frame. One of these half-pictures, namely $V'_{sync}$, is used for collecting the ordinary video information, whereas the other half picture, $V''_{sync}$, is used for controlling the circuits 7 and 12.

The start and stop line pulse generator 12, as shown in some detail in FIG. 3, comprises a start line pulse generator 15, a stop line pulse generator 16, a blanking logic circuit 17 and a line masking circuit 18. The generators 15 and 16 are virtually identical, and it is therefore sufficient to describe the start line pulse generator 15. The latter comprises an integrator 19, the output signal of which is a saw tooth voltage $P_1$ having an adjustable inclination corresponding to a $\Delta t_{start}$-value to be set as desired. The voltage $P_1$ is applied to the modulation input of a monostable device 20, which is triggered by the vertical sync pulses $H_{sync}$ and delivers pulses, the width of which is $t_{start}$-$\Delta t_{start}$, where $t_{start}$ is a value to be initially set as desired. The end flank of each pulse $P_2$ triggers another monostable device 21, which delivers line segment pulses $P_3$ having a width to be set as desired. Hereby, start line pulses corresponding to the left line segment LSL in FIG. 6 are transferred to the black level sensor circuit 7. Similarly, stop line pulses corresponding to the right line segment LSR are transferred to the circuit 7.

From FIG. 6 it will be seen that the $\Delta t_{start}$-value, which is set in the integrator circuit 19, will cause a certain inclination of the start line segment LSL, and a corresponding setting of the $\Delta t_{stop}$-value in the stop line pulse generator 16 will cause a similar inclination of the stop line segment LSR, so that the two segments LSL and LSR converge upwardly towards each other on the TV-image. By proper setting of the values $\Delta t_{start}$ and $\Delta t_{stop}$, the converging inclination can be adjusted in such a way that the real measuring distance is the same, irrespective of along which horizontal portion of the field of view of the TV-camera the object moves, as indicated by the lines M' and N' in FIG. 1. Moreover, the length of the distance can be easily adjusted by setting the values $t_{start}$ and $t_{stop}$.

As appears from FIG. 3, the outputs of the start line pulse generator 15 and the stop line pulse generator 16 are connected to a blanking logic circuit 17, by means of which only a desired vertical portion of the TV-image is provided with the start and stop lines LSL and LSR. Thus, by setting the values "start and stop lines mask" and "start and stop lines length" (compare FIG. 6), these lines LSL and LSR can be restricted to the desired portion of the field of view, e.g., corresponding exactly to the road-way C-I in FIG. 1.

As mentioned above, the start and stop line pulses from generator 12 are fed to the black level sensor 7, which is shown in detail in FIG. 4. The start line pulses actuate an analogue switch so as to let through corresponding portions or pulses P4 (compare FIG. 5) of the video signal from the detection TV-camera 1 to an integrator 23. It will be appreciated that these portions or pulses P4 together contain the video information within the start line segment LSL (FIG. 6). Thus, the integrator 23, which is reset at the end of each vertical sync pulse $V''_{sync}$, will deliver a voltage P5 corresponding to the integrated black level of the start line segment LSL. This voltage P5 is applied to a further analogue switch 24, which is actuated at the beginning of each sync pulse $V''_{sync}$ and delivers the corresponding voltage P6 (=P5) on the one hand to an integrator 25 and, on the other hand, to one of the two inputs of a comparator 26. The integrator 25 has a relatively large time constant and will initially retain at its output voltage P6 obtained in the preceding scan. Thus, by applying the voltage P7 to the other input of the comparator 26, the integrated blackness of successive video signal portions corresponding to the line segment LSL can be compared. A sudden change in blackness, as will be the case when a vehicle reaches the position A (FIG. 1 and 6), will thus be detected by the comparator 26. To increase the sensitivity, the comparator can be set to operate only within a certain vertical portion or window of the line segment LSL, e.g., corresponding to a particular lane of the road-way, e.g., D-F or F-H in FIG. 1.

When the comparator 26 senses a black level change exceeding a predetermined threshold value, it will deliver a start pulse at the output of the start pulse generator 27. Correspondingly, when the vehicle reaches the position A' (FIG. 1 and 6), a stop pulse will appear at the output of the stop pulse generator 28 indicated below in FIG. 4.

As explained above, these start and stop pulses will cause the counter 8 to count clock pulses during the time interval between these two pulses whereby the speed of the passing object can be easily calculated and presented in digital form on the TV-monitor 4 and, if desired, registered in the video tape recorder 5.

Those skilled in the art can make a number of modifications and detail variations within the scope of the appended claims. For example, the start and stop line segments LSL and LSR can easily be reversed so as to enable detection and speed measurement of a vehicle moving from the right to the left of the field of view, as indicated in FIG. 1 for the vehicle driving along line E between the positions B and B'.

I claim:

1. A method for supervising the speed of an object, such as a vehicle, relative to a reference point, comprising the steps of
   (a) mounting a TV-camera at said reference point and directing said TV-camera at a certain angle ($\alpha$) to the direction of movement of said object so that said object will pass substantially sideways in the field of view of the TV-camera;
   (b) triggering a pulse generator by means of video signals derived from said TV-camera; and
   (c) counting the pulses generated by said pulse generator while the image of said object is passing between two given marking lines on the TV-image, said marking lines corresponding to a measuring distance, the counted number of pulses constituting a measure of the speed of said object.

2. A device for supervising the speed of an object while the latter passes between the end points of a measuring distance, comprising
   (a) a TV-camera to be mounted at a reference point and directed at an angle to the path of movement of said object between said end points, so that said object will pass substantially sideways in the field of view of said TV-camera; and
   (b) video signal processing means connected to said TV-camera, said processing means including
      (i) first means for generating pulses at instances in a predetermined time relationship to the sync pulses associated with the TV scanning process, a first group of these pulses corresponding to a first substantially vertical line segment of the TV-image, whereas a second group of the pulses corresponds to a second, substantially vertical line segment of the TV-image, said first and second line segments being spaced apart a distance such as to define said measuring distance in conjunction with said angle and the distance of the TV-camera from said path of movement;
      (ii) second means for comparing, between successive frame scanning operations, the integrated black level contained in the video signal portions corresponding in time respectively to said first and second group of pulses, said second means delivering a start pulse upon a predetermined black level change in successive video signal portions corresponding to said first group of pulses, and a stop signal upon a predetermined black level change in successive video signal portions corresponding to said second group of pulses; and
      (iii) third means for measuring the time period elapsing between said start and stop pulses;
   (c) whereby the speed of said object can be calculated on the basis of said measuring distance and said time period.

3. A device as set forth in claim 2, wherein said third means comprises a clock pulse generator and a pulse counter, which is triggered by said start and stop pulses for counting the clock pulses generated by said clock generator during said time period, the count value thus obtained being inversely proportional to the speed of said object.

4. A device as set forth in claim 3, further comprising a count value/speed value converter and a character generator to enable display of the speed value in digital form on a TV-monitor.

5. A device as set forth in claim 2, wherein said first and second substantially vertical line segments are adjustable so as to incline convergently towards the upper part of the TV-image.

* * * * *